Oct. 23, 1923.

E. ROGERS 1,471,753

SHIPPING DEVICE

Original Filed March 18, 1918

Inventor
Edbert Rogers
By his Attorneys

Patented Oct. 23, 1923.

1,471,753

UNITED STATES PATENT OFFICE.

EDBERT ROGERS, OF FLINT, MICHIGAN.

SHIPPING DEVICE.

Original application filed March 18, 1918, Serial No. 223,045. Divided and this application filed March 30, 1922. Serial No. 548,027.

*To all whom it may concern:*

Be it known that I, EDBERT ROGERS, a citizen of the United States of America, and a resident of Flint, county of Genesee, and State of Michigan, have invented certain new and useful Improvements in Shipping Devices, of which the following is a full, clear, concise, and exact description, such as will enable others skilled in the art to which the invention relates to make and use the same, reference being made therein to the accompanying drawings, which form a part of this specification.

This invention relates to the shipping of assembled motor vehicles and more particularly to the means for anchoring the wheels of motor vehicles to the floor of freight cars or other conveyances during the shipment of said vehicles.

The principal object of the invention is the provision of a holding means that is adapted to engage a portion of the wheel for anchoring the same to the floor of a shipping conveyance, that is simple in construction, cheap to manufacture and that may be easily attached to and detached from the wheel of the motor vehicle.

Other and further objects and advantages of the invention will appear as the description proceeds.

Figure 1:
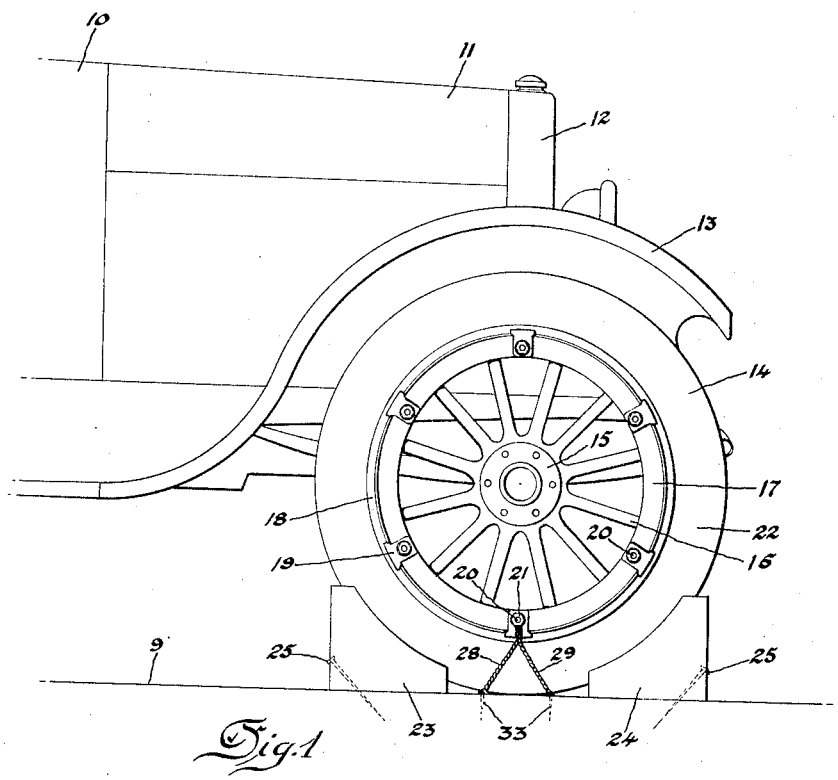
Figure 2:
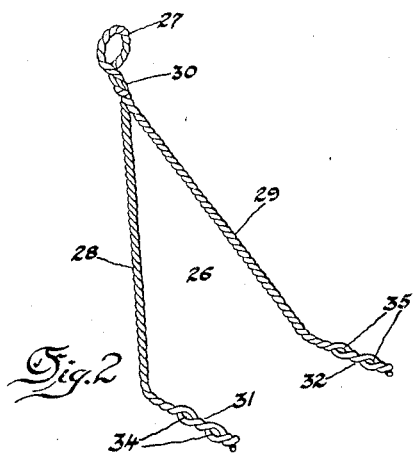

On the drawings, Fig. 1 is a side elevation of a portion of a motor vehicle with my device in position for holding the wheel to the floor of the shipping conveyance. Fig. 2 is a perspective view of the holding device.

In the shipping of assembled automobiles it is the common practice to provide one or more chock blocks for holding each wheel in position. Where two blocks for each wheel are used they are employed for engaging at the front and rear of each wheel to prevent lateral and longitudinal movement of the vehicle during shipment. It has been found necessary to supplement this arrangement by holding or anchoring means which are adapted to prevent vertical movement of the vehicle. Two forms of such holding means are disclosed in my co-pending application S. N. 223,045 filed March 18, 1918, of which this is a division and in which one of those forms is shown.

Reference now being had to the drawing, the numeral 9 designates the floor of a freight car or other shipping conveyance on which is adapted to be secured for shipment a motor vehicle 10. The motor vehicle 10 is provided with a hood 11, radiator 12, fender 13 and wheel 14, all of which may be of the usual or well known construction. The wheel 14 includes the hub 15, spokes 16, felloe 17 and the rim 18 which is secured on the felloe 17 by means of the wedges 19 mounted on the rim wedge bolts 20 and secured in adjusted position thereon by means of the nuts 21, as is usual in such constructions. The tire 22 is mounted on the rim 18 in the usual manner.

In securing or anchoring motor vehicles to the floor of freight cars and other shipping conveyances it is the common practice to employ chock blocks for engaging the wheels for preventing displacement of said vehicle. One or more of these blocks for each wheel is employed for this purpose. As shown on the drawing two blocks 23 and 24 for each wheel are employed. The wheel engaging faces of these blocks are curved and channeled for receiving the tire of the wheel as is usual in such constructions. One of these blocks engages the wheel at the front thereof and the other at the rear of the same. They are adapted to be secured to the floor of the shipping conveyance by any suitable means such as the nails 25. The blocks 23 and 24 are adapted to prevent longitudinal and lateral movement of the vehicle relatively to the floor 9. The sudden jerking and jarring of the shipping conveyance, however, tends to cause the automobile wheels to ride up out of the grooves in these blocks, due to the inertia of the vehicle. Means are provided for preventing this movement. Such means may be of any suitable shape and material, such as an elongated metallic member that may be bent to the required shape. As shown on the drawings, a length of wire rope or cable is employed although it is understood that the holding or tie member may be formed from a single solid member, if desired.

The tie, holding member, or wheel securing device 26 is preferably formed from a single length of material, although it may be otherwise constructed. Its intermediate portion is bent to form a wheel engaging seat portion as the return bend or loop 27.

The ends of the holding member extend in a plane at an angle to the seat portion to form the legs 28 and 29.

The seat portion 27 is adapted to engage the wheel 14 in any suitable manner as by engaging the rim wedge bolt 20 of the wheel 14. The loop or seat portion 27 is adapted to be secured on the bolt 20 by the nut 21. The ends of the tie member may be twisted about one another, if desired, as shown at 30, in order to make the loop 27 a closed one. From the loop or seat portion 27 the legs 28 and 29 diverge and extend downwardly and outwardly. In other words, the legs are arranged at an angle to each other and in a plane at an angle to the plane of the loop or seat portion 27. The legs terminate or are provided with horizontal feet 31 and 32 which are adapted to be secured to the floor of the shipping conveyance by any suitable fastening means such as the nails 33 which are adapted to be driven through openings 34 and 35 formed in the feet 31 and 32 for securing the same to the floor.

It will thus be noted that the legs 28 and 29 when in operative position not only extend forwardly and rearwardly but also extend laterally of the wheel whereby the holding member 26 not only prevents vertical movement of said wheel but also tends to prevent either lateral or longitudinal movement thereof.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

What I claim is:—

1. In combination, a wheeled vehicle, a support therefor, a holding member provided with a loop secured to a rim wedge bolt of one of the wheels of said vehicle, said said member provided with diverging legs extending downwardly and outwardly at an angle from said wheel and provided at their lower ends with feet and means for securing said feet to said support.

2. In combination with a vehicle provided with wheels, a support therefor, a holding member having a seat portion for engaging a lower portion of one of said wheels, said member being provided with legs extending at an angle to said seat portion, attaching members secured to the lower ends of said legs and means for securing said attaching members to said support.

3. In combination with a vehicle provided with wheels, a support therefor, a holding member engaging one of said wheels for preventing vertical movement thereof and having a plurality of members extending downwardly and laterally outwardly therefrom, and means for securing said holding member to said support.

4. A wheel securing device formed from a single length of material having its intermediate portion bent to form a wheel engaging seat and having its ends bent in a plane at an angle to said seat and provided with feet for securing the same to the floor of a shipping conveyance.

5. In a device of the class described, a seat portion for engaging a portion of a wheel for preventing vertical movement thereof, legs arranged at an angle to said seat portion and adapted to extend downwardly and laterally outwardly from said wheel, and means including attaching members for securing said device to the floor of a shipping conveyance.

6. A holding member for anchoring a vehicle to the floor of a shipping conveyance consisting of a single length of material bent back upon itself to form a loop for engaging a rim wedge bolt on a vehicle wheel, leg members extending at an angle to said loop, and attaching feet secured to said leg members and extending at an angle thereto.

7. A holding member for anchoring a vehicle wheel to its support consisting of a single length of material having its intermediate portion provided with a return bend twisted upon itself to form a loop for engaging a bolt on a wheel, and diverging leg portions extending at an angle to said loop and terminating in attaching feet provided with openings therethrough for the reception of fastening means, substantially as shown and described.

8. A holding member for anchoring a vehicle to the floor of a shipping device, consisting of a single length of material bent at its intermediate portion to form a seat for engaging about a portion of a wheel and having its end portions extending in a plane at an angle to said seat portion.

In testimony whereof I affix my signature.

EDBERT ROGERS.